Oct. 25, 1966  T. LEWIS ET AL  3,280,457
HEAVY DUTY WEED CUTTER
Filed Oct. 24, 1965  2 Sheets-Sheet 2
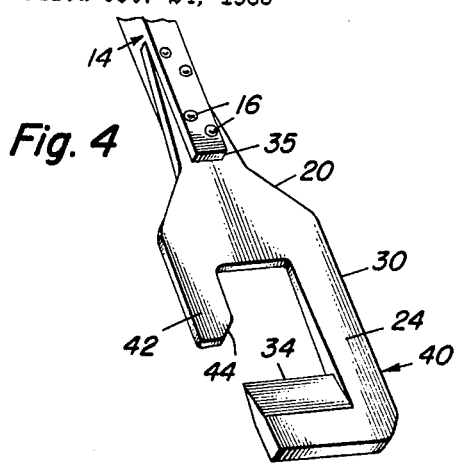
Fig. 4
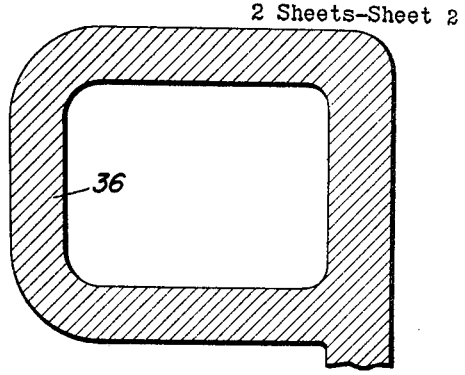
Fig. 6
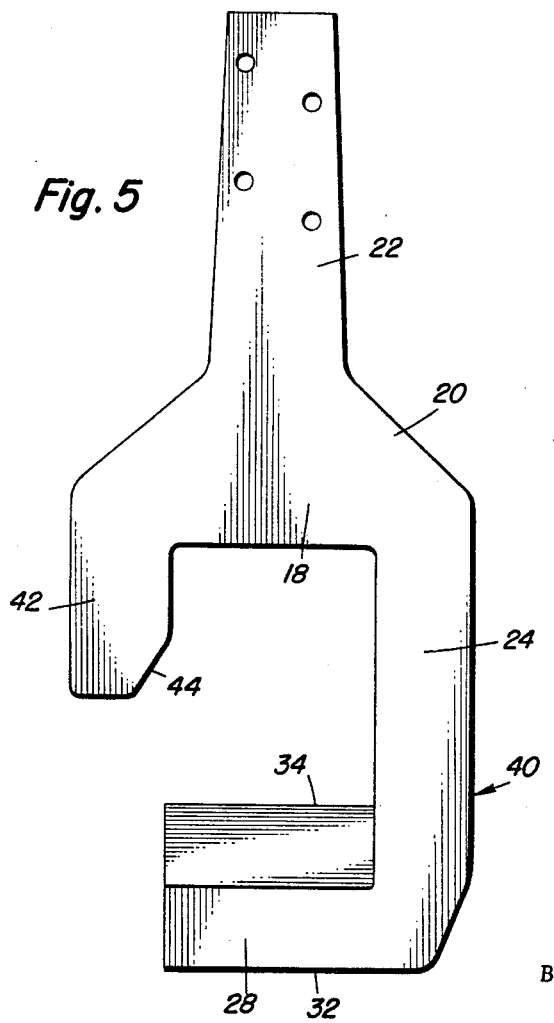
Fig. 5
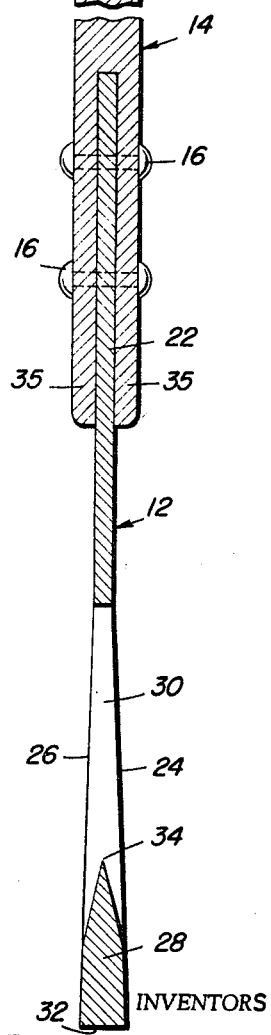
INVENTORS
Thomas Love
Thomas Lewis
BY Tustan Miller
ATTORNEY United States Patent Office 3,280,457
Patented Oct. 25, 1966

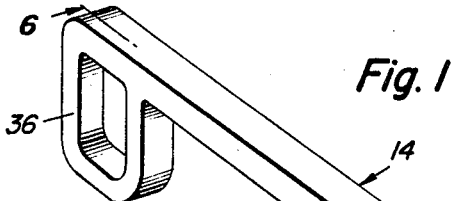
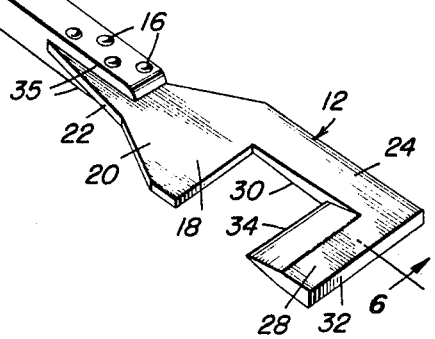
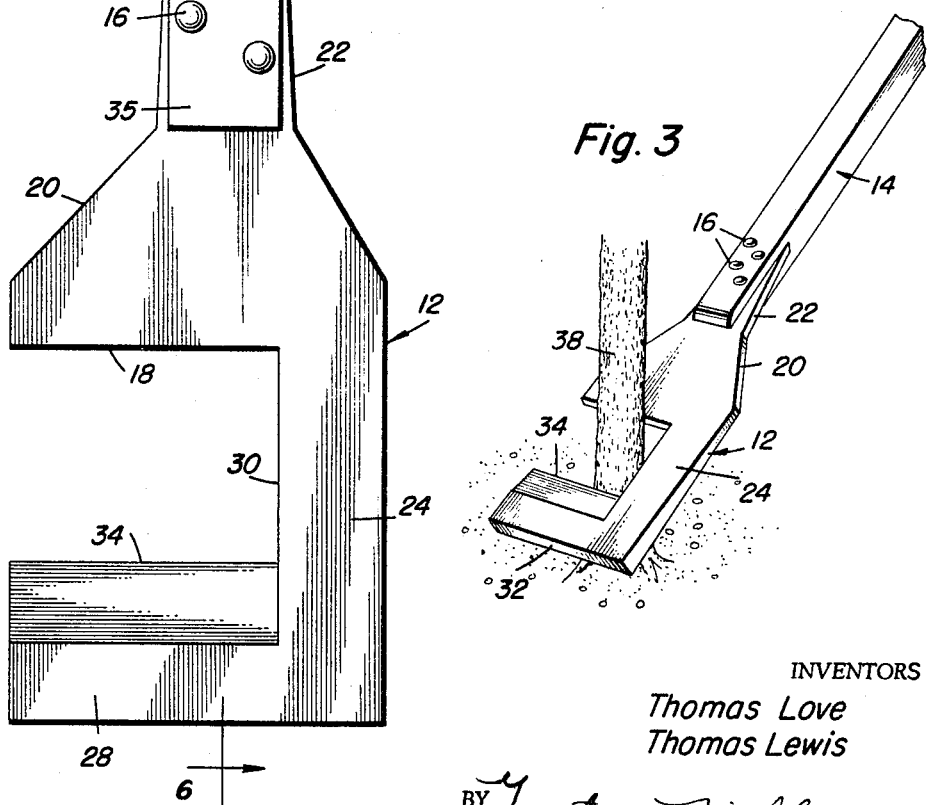

3,280,457
HEAVY DUTY WEED CUTTER
Thomas Lewis and Thomas Love, both of
3702 W. Polk St., Chicago, Ill.
Filed Oct. 24, 1965, Ser. No. 504,614
3 Claims. (Cl. 30—317)

This invention relates to a weed cutter and has for an object to provide a heavy duty weed cutter especially intended for heavy weeds that normally grow in cotton, corn and bean fields, which weeds not only consume a great deal of the nutriment in the ground, but are also a mechanical danger to the farm machinery normally used in harvesting such crops. Some of the weeds in question grow up about seven feet, more or less, and have a circumference of about two and one-half inches at their bottom, or a thickness of almost an inch, and thus are a formidable obstruction and danger to the harvesting machinery, causing severe damage thereto. Such weeds should be eliminated preferably in July and August so that the farm crop can be harvested without the presence of such weeds in a size to damage the harvesting machinery.

It is an object of this invention to provide such a weed cutter, which has a heavy duty blade, which can be hooked about the weed, is of substantial weight and strength that it can be then pushed down to the ground, and then pulled up to cut the stalk of the weed at or close to ground level.

A further object of this invention is to provide a heavy duty weed cutter that is of substantial strengh and is provided with a strong cutting edge, for cutting through woody weed stalks.

In brief, the heavy duty weed cutter of this invention is a hand tool having a blade that is substantially C-shaped, with legs and bight of the C being both straight and rather wide. A shank for attachment to a handle extends from the back of one leg of the C, and a cutter edge, preferably V-shaped in cross section, is formed on the inner edge of the other leg of the C, thus forming a hook, sharpened on the hooking edge. The blade is made of a thick, sheet plate corrosion-resistant metal, such as stainless steel or the like, with opposite plane surfaces, and a handle is attached to the handle shank of the blade, the handle being provided with a hand-receiving loop extending in a plane perpendicular to that of the blade. In a slightly modified form, one leg of the C, preferably the handle shank leg, is provided with a thumb partly closing the C, but beveled at its inner point so that the blade may be readily hooked about the woody weed stalk for which it is intended. In either form, the blade is heavy and rigid, so that when placed or hooked about the weed stalk, the blunt edge of the back of the cutter edge leg may be pushed down to the soil, and then, by means of the handle, the blade is pulled up at a cutting angle against the weed stalk, to cut it off at or close to the ground level.

With the above and related objects in view, this invention consists in the details of construction and combination of parts, as will be more fully understood from the following description, when read in conjunction with the accompanying drawing, in which:

FIG. 1 is a perspective view of the weed puller in its entirety.

FIG. 2 is an enlarged plan view of the weed cutter end of the puller.

FIG. 3 is a perspective view showing the weed puller in weed cutting position.

FIG. 4 is a perspective view of FIG. 2.

FIG. 5 is a plan view of a modified form of weed puller.

FIG. 6 is a longitudinal sectional view of the weed puller on lines 6—6 of FIGS. 1 and 2.

There is shown at 10 the heavy duty weed cutter of this invention. This weed cutter 10 is especially intended for cutting heavy weeds at ground level, particularly heavy weeds of the type often growing in cotton, corn and bean fields, and often attaining a thickness of two and one-half inches at ground level, and from five to seven feet in height, more or less. Such weeds often have a woody stalk, and hence it is too difficult to cut by use of the usual hand weed cutter tool of the type used in weeding lawns. The weed cutter 10 of this invention consists of two separate parts, the cutter blade 12 and the handle 14, securely and permanently secured together by rivets 16.

The blade 12 is made of thick sheet plate metal, such as stainless steel or other corrosion-resistant steel, and is substantially C-shaped, or shaped like the letter U lying on its side. One leg 18 of the C has an extending tapered portion 20 terminating in an extending somewhat tapered handle shank 22 provided with apertures therethrough for receiving the rivets 16 for securing it to the handle 14.

Both surfaces 24 and 26 of the blade 12 are substantially planar, and diverge slightly from each other at the other leg 28, and the C bight 30, so as to increase the thickness, strength and weight of the blunt edge 32 of the leg 28, thus providing more weight and "feel" to the weed cutter 10.

On leg 28, the inner edge is provided with a V-shaped sharp cutting edge 34, thus locating the actually sharp edge 34 midway between the planar surfaces 24 and 26 of the weed cutter 10, and making it readily usable by either a right hand or a left hand operator.

The handle 14 is bifurcated at 35 so as to fit snugly on both sides of the blade shank 22 and be held securely thereto by the rivets 16. The handle 14, which may be of wood or other suitable material, is provided at its other end with a hand-receiving loop 36 extending in a plane perpendicular to the plane of the blade 12, and thus may be readily held in either the right or the left hand. The blade 12 itself will weigh approximately between two and one-half and three pounds, and the overall length of the cutter 10 will be convenient for a person of average height.

In operation, the operator, holding his hand in the hand loop 36, will place the blade with its C forming a hook, about the woody stalk 38 of the weed, with the blunt edge 32 close to the ground, and then lift and pull the handle loop 36. The stalk being up to two and one half inches in circumference, or about four fifths of an inch, more or less, in diameter will tend to be gripped between the leg 18 and the sharp cutting edge 34, and a short jerk or pull on the handle loop 36 will readily sever the weed stalk 38 close to the ground level, leaving the ground substantially clear and free of obstructions, and permit ready operation of the appropriate farm machinery in between the corn, beans or cotton rows forming the crop to be harvested.

The modified form of the blade shown at 40 in FIG. 4 is identical with that at 12 except for the additon of a thumb 42 extending from the free end of leg 18 and beveled on its inner corner at 44, and this beveled corner 44 is far enough from the cutting edge 34 to permit ready entry of the weed stalk 38 therebetween so that its cutting operation is substantially the same as that already described above. However, the presence of the thumb 40 tends to provide more of a closed hook about the stalk 38, thus being less likely to disengage without cutting the stalk if handled somewhat carelessly. However, when handled properly, both forms do an efficient job.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A heavy duty weed cutter comprising a substantially C-shaped hook blade of thick, sheet plate metal, the opposite surfaces of said sheet metal plate being substantially planar, a handle shank extending perpendicularly from one transverse leg of said C-shaped blade, a transversely extending cutting edge on the inside edge of the other transverse leg of said C-shaped blade, the length of said first-mentioned transverse leg being at least the length of said transverse cutting edge leg, said opposite planar surfaces diverging from each other from said handle shank leg toward the end of said cutting edge leg, said cutting edge leg outside end being blunt.

2. The weed cutter of claim 1, and a handle therefor, said handle having a bifurcated end extending over opposite sides of said handle shank and securely fastened thereto, and a hand receiving loop on said handle, said loop extending on a plane perpendicular to the plane of said C-shaped hook blade.

3. The weed cutter of claim 1, and a thumb extending from said first-mentioned transverse leg partly closing the open side of said C-shaped blade, the inside end of said thumb being beveled.

References Cited by the Examiner

UNITED STATES PATENTS

| | | | |
|---|---|---|---|
| 1,276,685 | 8/1918 | Payment | 30—317 |
| 1,855,202 | 4/1932 | Richmond et al. | 30—317 |
| 2,582,677 | 1/1952 | Burnett | 30—317 X |
| 2,775,034 | 12/1956 | Bulecki | 30—317 X |

FOREIGN PATENTS

| | | |
|---|---|---|
| 60,585 | 3/1939 | Norway. |
| 85,320 | 1/1936 | Sweden. |

References Cited by the Applicant

UNITED STATES PATENTS

| | | |
|---|---|---|
| 83,290 | 10/1868 | King. |
| 355,182 | 12/1886 | Lefavour. |
| 1,951,978 | 3/1934 | Haskins. |
| 2,028,483 | 1/1936 | Van Yahres. |
| 2,194,597 | 3/1940 | Johnson. |
| 2,662,461 | 12/1953 | Upson. |
| 2,873,809 | 2/1959 | Loomis. |

WILLIAM FELDMAN, *Primary Examiner.*

JAMES L. JONES, Jr., *Examiner.*